United States Patent
Kristiansson et al.

(10) Patent No.: US 11,044,340 B2
(45) Date of Patent: Jun. 22, 2021

(54) SECURITY FOR A SOFTWARE CONTAINER

(71) Applicant: Telefonaktiebolaget LM Ericsson (publ), Stockholm (SE)

(72) Inventors: Johan Kristiansson, Luleå (SE); Daniel Bergström, Luleå (SE); Jonas Lundberg, Luleå (SE); Nicklas Sandgren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/481,991

(22) PCT Filed: Jan. 31, 2017

(86) PCT No.: PCT/EP2017/052028
§ 371 (c)(1),
(2) Date: Jul. 30, 2019

(87) PCT Pub. No.: WO2018/141363
PCT Pub. Date: Aug. 9, 2018

(65) Prior Publication Data
US 2019/0394302 A1    Dec. 26, 2019

(51) Int. Cl.
*G06F 15/16* (2006.01)
*H04L 29/08* (2006.01)
(Continued)

(52) U.S. Cl.
CPC .......... *H04L 67/34* (2013.01); *G06F 21/602* (2013.01); *H04L 9/3247* (2013.01);
(Continued)

(58) Field of Classification Search
CPC ....... H04L 67/34; H04L 67/104; H04L 67/16; H04L 9/3247; H04L 2209/38; G06F 21/602
(Continued)

(56) References Cited

U.S. PATENT DOCUMENTS 9,129,095 B1 *   9/2015   Lam ................ H04L 63/061
10,608,896 B2 *  3/2020   DeLuca ........... H04L 41/5009
(Continued)

FOREIGN PATENT DOCUMENTS

WO    2016099346 A1    6/2016
WO    2016195562 A1    12/2016

OTHER PUBLICATIONS

Newman, Sam, "Building Microservices", O'Reilly Media, Inc., Feb. 2015, pp. 1-469.
(Continued)

*Primary Examiner* — Alicia Baturay
(74) *Attorney, Agent, or Firm* — Murphy, Bilak & Homiller, PLLC

(57) ABSTRACT

It is presented a method performed in a deployment server being configured to deploy a software container. The method comprises the steps of: receiving a trigger to deploy a software container; obtaining an image intended for the software container comprising a set of at least one module; injecting a security module in the image; obtaining a container specification of the image; configuring the security module to forward incoming communication to the set of at least one module in accordance with the obtained container specification; modifying the container specification such that the at least one service is accessed externally only via the security module and that all outgoing communication, from the set of at least one module, is directed via the security module; publishing the modified container specification in a service discovery repository; and deploying the software container on at least one execution server.

20 Claims, 7 Drawing Sheets

(51) Int. Cl.
*G06F 21/60* (2013.01)
*H04L 9/32* (2006.01)

(52) U.S. Cl.
CPC ............ *H04L 67/104* (2013.01); *H04L 67/16* (2013.01); *H04L 2209/38* (2013.01)

(58) Field of Classification Search
USPC .......................................................... 709/219
See application file for complete search history.

(56) References Cited

U.S. PATENT DOCUMENTS

| | | | | |
|---|---|---|---|---|
| 10,715,607 B2* | 7/2020 | Poon | .................. | H04L 41/0816 |
| 10,798,058 B2* | 10/2020 | Sengupta | ............ | H04L 63/0218 |
| 10,802,857 B2* | 10/2020 | Gunda | ................ | H04L 63/0254 |
| 10,802,858 B2* | 10/2020 | Gunda | ................ | H04L 63/1441 |
| 10,802,893 B2* | 10/2020 | Chanda | .................. | G06F 9/542 |
| 10,803,173 B2* | 10/2020 | Gunda | ................ | G06F 21/602 |
| 10,805,332 B2* | 10/2020 | Gunda | ................ | H04L 63/1416 |
| 10,812,451 B2* | 10/2020 | Gunda | ................ | G06F 9/45558 |
| 10,841,328 B2* | 11/2020 | Estes | .................. | H04L 63/1433 |
| 10,862,773 B2* | 12/2020 | Chanda | ............... | H04L 41/0806 |
| 2015/0379287 A1* | 12/2015 | Mathur | ................ | G06F 21/602 726/27 |
| 2016/0292431 A1* | 10/2016 | Sreekanti | ................ | H04L 63/00 |
| 2018/0174097 A1* | 6/2018 | Liu | ........................ | H04L 9/3239 |
| 2019/0272495 A1* | 9/2019 | Moeller | ............. | G01F 23/296 |
| 2019/0272496 A1* | 9/2019 | Moeller | ............. | G01F 23/2962 |
| 2019/0379578 A1* | 12/2019 | Mishra | ................ | H04L 41/5051 |
| 2019/0379579 A1* | 12/2019 | Mishra | ................ | H04L 41/0803 |
| 2020/0183766 A1* | 6/2020 | Kumar-Mayernik | ........................ | G06F 40/169 |

OTHER PUBLICATIONS

Pendry, Jan-Simon, et al., "Union Mounts in 4.4BSD-Lite Jan-Simon Pendry", Sequent UK, Jan. 16-20, 1995, pp. 1-11.
Unknown, Author, "Docker (software)", Wikipedia, the free encyclopedia, Jan. 29, 2017, pp. 1-6.

* cited by examiner

SECURITY FOR A SOFTWARE CONTAINER

TECHNICAL FIELD

The invention relates to methods, deployment servers, execution servers, computer programs and computer program products using a security module with a software container.

BACKGROUND

Recently, microservices have become a popular architecture to build modern Web services. Microservices are small modular services that are independently deployable and independently executable. By breaking down a complex monolithic application into small independent microservices, it becomes possible to develop services that are more resilient to error and more scalable. For example, if a particular microservice would fail, it would not affect the entire service. However, if a component part of a monolithic service would fail, the entire service would have to be restarted. Also, the only way to scale a monolithic service is to duplicate the whole monolith by adding more instances of it. In a microservice based architecture on the other hand, only the services that need to be scaled need to be duplicated.

Software containers are commonly used to implement microservice-based architectures and make sure services can run independently of each other. In contrast to virtual machines, software containers are more lightweight and can instantly be started, similar to standard Unix processes, assuming the server has all images required to start the software container. An image is a container file containing a collection of files used to deploy the software container. The image can contain both program code and metadata, defining an initial state of the software container. Another advantage is that software containers provide a reliable execution environment allowing developers to develop and test their services locally on their machine and then upload the image to a cloud platform and still be sure the software containers behave similarly as running them locally.

Docker is an example of a software container runtime that has recently gained popularity. By allowing container images to be stacked in a so-called union file system, container images can be distributed more efficiently.

When the software containers communicate with external entities, such as other software containers, this communication sometimes needs to be encrypted. However, it is cumbersome and inefficient to modify the affected software containers for encrypted communication when necessary.

SUMMARY

It is an object to provide software containers with a convenient and efficient way to implement secure communication.

According to a first aspect it is presented a method performed in a deployment server, the deployment server being configured to deploy a software container. The method comprises the steps of: receiving a trigger to deploy a software container; obtaining an image intended for the software container comprising a set of at least one module; injecting a security module in the image; obtaining a container specification of the image, the container specification comprising information of at least one service exposed by the set of at least one module; configuring the security module to forward incoming communication to the set of at least one module in accordance with the obtained container specification; modifying the container specification such that the at least one service is accessed externally only via the security module and that all outgoing communication, from the set of at least one module, is directed via the security module; publishing the modified container specification in a service discovery repository; and deploying the software container on at least one execution server.

The method may further comprise the steps of: obtaining an identifier of the image; creating a credential for the image, the credential comprising a public key and a private key; publishing the public key in a distributed security repository; and providing the private key to the security module.

The step of creating a credential may be performed in the security module. In this case, the method further comprises the steps of: providing an access token to the security module for enabling access to the distributed security repository.

The method may further comprise the steps of: adding the identifier of the image to a container group of the distributed security repository; and providing an identifier of the container group to the security module.

The distributed security repository may be a blockchain database.

The service discovery repository may be a distributed peer-to-peer service discovery repository.

According to a second aspect it is presented a deployment server being configured to deploy a software container. The deployment server comprises: a processor; and a memory storing instructions that, when executed by the processor, cause the deployment server to: receive a trigger to deploy a software container; obtain an image intended for the software container comprising a set of at least one module; inject a security module in the image; obtain a container specification of the image, the container specification comprising information of at least one service exposed by the set of at least one module; configure the security module to forward incoming communication to the set of at least one module in accordance with the obtained container specification; modify the container specification such that the at least one service is accessed externally only via the security module and that all outgoing communication, from the set of at least one module, is directed via the security module; publish the modified container specification in a service discovery repository; and deploy the software container on at least one execution server.

The deployment server may further comprise instructions that, when executed by the processor, cause the deployment server to: obtain an identifier of the image; create a credential for the image, the credential comprising a public key and a private key; publish the public key in a distributed security repository; and provide the private key to the security module.

The instructions to create a credential may be performed in the security module. In this case, the deployment server further comprise instructions that, when executed by the processor, cause the deployment server to: provide an access token to the security module for enabling access to the distributed security repository.

The deployment server may further comprise instructions that, when executed by the processor, cause the deployment server to: add the identifier of the image to a container group of the distributed security repository; and provide an identifier of the container group to the security module.

The distributed security repository may be a blockchain database.

The service discovery repository may be a distributed peer-to-peer service discovery repository.

According to a third aspect it is presented a deployment server comprising: means for receiving a trigger to deploy a software container; means for obtaining an image intended for the software container comprising a set of at least one module; means for injecting a security module in the image; means for obtaining a container specification of the image, the container specification comprising information of at least one service exposed by the set of at least one module; means for configuring the security module to forward incoming communication to the set of at least one module in accordance with the obtained container specification; means for modifying the container specification such that the at least one service is accessed externally only via the security module and that all outgoing communication, from the set of at least one module, is directed via the security module; means for publishing the modified container specification in a service discovery repository; and means for deploying the software container on at least one execution server.

According to a fourth aspect it is presented a computer program comprising computer program code which, when run on a deployment server being configured to deploy a software container causes the deployment server to: receive a trigger to deploy a software container; obtain an image intended for the software container comprising a set of at least one module; inject a security module in the image; obtain a container specification of the image, the container specification comprising information of at least one service exposed by the set of at least one module; configure the security module to forward incoming communication to the set of at least one module in accordance with the obtained container specification; modify the container specification such that the at least one service is accessed externally only via the security module and that all outgoing communication, from the set of at least one module, is directed via the security module; publish the modified container specification in a service discovery repository; and deploy the software container on at least one execution server.

According to a fifth aspect it is presented a computer program product comprising a computer program according to the fourth aspect and a computer readable means on which the computer program is stored.

According to a sixth aspect it is presented a method for establishing a connection of between a local software container of a local execution server and a remote software container of a remote execution server. The method is performed in the local software container of the local execution server and comprising the steps of: receiving a request from the remote software container to establish a connection between the remote software container and the local software container, the request comprising an identifier of the remote software container; obtaining a public key of the remote software container from a distributed security repository using the identifier of the remote software container; validating the request using the public key of the remote software container; when the request is found to be valid, obtaining container group data from the distributed security depository, and proceeding with connection establishment when both the remote software container and the local software container belong to the same container group.

The request may comprise an identifier of a container group to which the remote software container belongs.

The step of validating may comprise validating the request by validating a signature of the request using a digital signature of the request.

The distributed security repository may be a blockchain database.

According to a seventh aspect it is presented an execution server for establishing a connection of between a local software container of the execution server, being a local execution server, and a remote software container of a remote execution server. The local execution server comprises: a processor; and a memory storing instructions that, when executed by the processor, cause the local execution server to: receive a request from the remote software container to establish a connection between the remote software container and the local software container, the request comprising an identifier of the remote software container; obtain a public key of the remote software container from a distributed security repository using the identifier of the remote software container; validate the request using the public key of the remote software container; and when the request is found to be valid, obtain container group data from the distributed security depository, and proceeding with connection establishment when both the remote software container and the local software container belong to the same container group.

The request may comprise an identifier of a container group to which the remote software container belongs.

The step of validating may comprise validating the request by validating a signature of the request using a digital signature of the request.

The distributed security repository may be a blockchain database.

According to an eighth aspect it is presented an execution server comprising: means for receiving a request from a remote software container of a remote execution server to establish a connection between the remote software container and a local software container of the execution server, being a local execution server, the request comprising an identifier of the remote software container; means for obtaining a public key of the remote software container from a distributed security repository using the identifier of the remote software container; means for validating the request using the public key of the remote software container; and means for, when the request is found to be valid, obtaining container group data from the distributed security depository, and proceeding with connection establishment when both the remote software container and the local software container belong to the same container group.

According to a ninth aspect it is presented a computer program for establishing a connection of between a local software container of an execution server, being a local server, and a remote software container of a remote execution server. The computer program comprises computer program code which, when run on the local execution server causes the local execution server to: receive a request from the remote software container to establish a connection between the remote software container and the local software container, the request comprising an identifier of the remote software container; obtain a public key of the remote software container from a distributed security repository using the identifier of the remote software container; validate the request using the public key of the remote software container; and when the request is found to be valid, obtain container group data from the distributed security depository, and proceeding with connection establishment when both the remote software container and the local software container belong to the same container group.

According to a tenth aspect it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
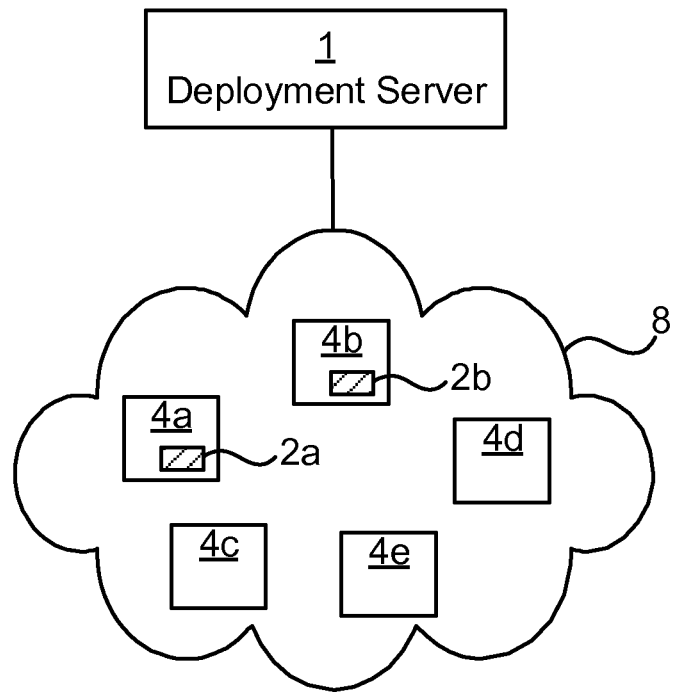
FIG. 1 is a schematic drawing illustrating an environment in which embodiments presented herein can be applied.

FIG. 1 is a schematic drawing illustrating an environment in which embodiments presented herein can be applied.

There are here a number of execution servers 4a-e forming part of a set 8 of execution servers. While, in this example, there are eight execution servers 4a-e shown, the set 8 of execution servers can contain any suitable number of execution servers and the number can vary over time. Each one of the execution servers 4a-e can execute software containers when required, as described in more detail below.

Each execution server can execute zero, one or more software containers (in parallel, when applicable). In this example, there is a first software container 2a in a first execution server 4a and a second software container 2b in a second execution server 4b. The first software container 2a and the second software container 2b can communicate with each other when needed. According to embodiments here, the communication between the software container 2a, 2b can occur in a secure manner.

For instance, the software containers can be containers running on a Docker platform. The software containers are distributed as images being files (images are here not to be confused with illustrations/photographs). An image contains in itself a collection of files which are used to deploy the software container. The collection of files contains at least one module, being a software module, and optionally one or more specification documents. Moreover, a method called process injection is used to add additional modules into the image. As is explained in more detail below, the process injection is used to add a security module to images prior to deployment to thereby provide secure communication capability.

A deployment server 1 is used when a set of software containers are to be deployed. One image can be used for multiple instances of a software container. The deployment server 1 only needs to deploy (at least) one software container and a deployment configuration. Additional software containers of the same type can then optionally be deployed without further management by the software containers themselves. In other words, the deployment server 1 is needed for initial deployment of a new software container, but the number of concurrent instances running of a particular software container can optionally be managed by the software containers.

The set of execution servers 8 is organised in a decentralized peer-to-peer network, which can be implemented on an underlying network, such as an IP (Internet Protocol) network.

To provide the decentralized solution, this can be based on a Distributed Hash Table (DHT) algorithm, such as Kademlia, Chord or Pastry.

Figure 2:
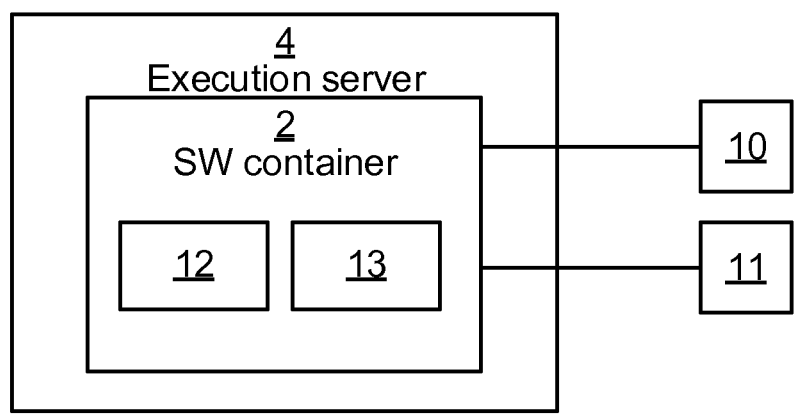
FIG. 2 is a schematic drawing illustrating one execution server of those shown in FIG. 1.

FIG. 2 is a schematic drawing illustrating one execution server 4 shown in FIG. 1. The execution server 4 can be any of the execution servers 4a-e shown in FIG. 1.

The execution server 4 contains zero, one or more software containers 2 which are executable by the execution server 4. When present. each software container 2 is a deployment based on an image and contains at least one original module 12 performing the desired function of the software container 2. Additionally, according to embodiments presented herein, a security module 13 has been injected in the software container to allow transparent secure communication to and from the at least one original module 12.

The software container 2 makes use of a service discovery repository to for its own discovery and for discovery of other software containers. The service discovery repository to can be implemented as a peer-to-peer repository, e.g. using DHT as described above.

Moreover, a distributed security repository 11 can be used, e.g. for storing public keys of credentials, as described in more detail below. The distributed security repository 11 can be implemented as a tamper resistant database, e.g. a blockchain.

Now an embodiment of the peer-to-peer networks for the execution servers will be described based on Bitverse. Bitverse is a framework to build decentralized peer-to-peer application. Bitverse is based on the Kademlia DHT algorithm and provides a messaging API (Application Programming Interface) and a key value store API. In both APIs, self-generated SHA-1 (Secure Hash Algorithm-1) strings are used to identify node end-points and data objects. Bitverse is thus a DHT implementation of a decentralised repository.

Bitverse consists of two different types of nodes, super nodes and edge nodes. Edge nodes are connected using web sockets to a super node and thus forms a star topology. An edge node can either run as a library in a web browser client or in an execution server component directly.

Super nodes communicate using UDP (User Datagram Protocol). Messages are routed using a routing table provides by Kademlia. The routing table consists of 160 buckets where each bucket contains a limited list of contacts (typically 20) discovered by the super node. XOR (Exclusive OR) is used to determine the distance between two different nodes in the network and which bucket a contact should be stored in. This makes it possible to implement an iterative protocol where a node calculates which contacts in its routing table that has the shortest distance to a particular string, or the SHA-1 of the string to be more specific. These contact are then queries until there are no more nodes to query. This makes it possible to find the nodes in the whole network that has the shortest distance to a particular string. Like all DHTs, this procedure is very efficient, typically O(log n) messages need to be sent, where is n is the number of nodes in the network and O denotes order.

By calculating a SHA-1 of the key it becomes possible to calculate which nodes in the network a particular key-value pair should be stored, and thus implement a distributed data repository where data is replicated in the network. In Bitverse, the value is represented as an unordered set, which makes it possible to store multiple values associated with a specific key. This special key-value(s) pair is called a SetMap. Below is an example of SetMap storing 5 values, identified by the key "hello".

"hello"=>{value2, value1, value5, value4, value3}
The SetMap provides a simple API, for example

```
setmap = bitverse.getSetMap("hello")
setMap.AddValue("value6")
```

It is also possible to set a time-to-live (TTL) on a value stored in a SetMap, e.g.
setMap.AddValueTTL("mykey", "value7", 2)

In this case, value7 is automatically purged after 2 seconds. The TTL mechanism can optionally be combined with a tracking mechanism where a client is notified when a value is added or removed to implement service discovery. If a client stops adding a specific value with a TTL, the value will automatically be purged when the TTL expired, thus causing a tracking event to other clients which can then take appropriate actions. This is one mechanism which can be used by the lifecycle mechanism described below.

The SetMap is also used internally in Bitverse to provide a messaging service. When an edge node connects to a super node, the super node will store the IP number and UDP port of the super node as a value in a SetMap, where the self-generated SHA-1 identity of the edge node is used as a key. This makes it possible for an edge node to send messages to any other edge node in the network, by allowing the super nodes to use the information stored in the SetMap to set up tunnels between different super nodes.

Below is an example of a messaging API call to send a message to a remote edge node, where 4cd7e1804bad563d32a416df5f915efbb013ee6f is the address of the remote edge node.

```
bitverse.sendMessage
("4cd7e1804bad563d32a416df5f915efbb013ee6f",
"hello")
```

The message is sent to edge node's local super node, which will tunnel the message to a foreign super node where the remote edge node is connected, assuming the remote edge is not directly connected to the local super node. In this case, the message can be send directly without using a tunnel link.

Figure 3A:
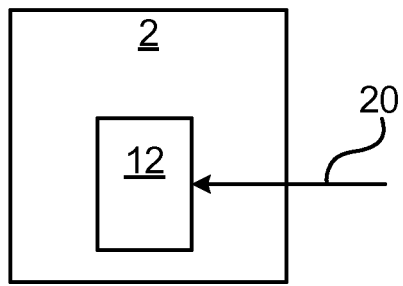
FIGS. 3A-B are schematic drawings illustrating the use of a security module for incoming communication in a software container of FIG. 2 according to one embodiment.
Figure 3B:
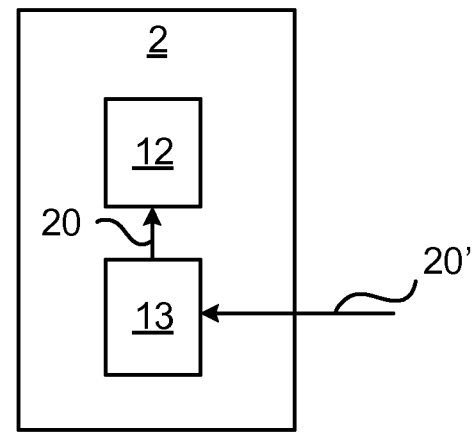

FIGS. 3A-B are schematic drawings illustrating the use of a security module for incoming communication in a software container 2 of FIG. 2 according to one embodiment. FIG. 3A illustrates incoming communication according to the prior art. The at least one original module 12 of the software container receives incoming communication 20, e.g. from a remote software container.

Looking now to FIG. 3B, the security module 13 first receives encrypted incoming communication 20'. The encrypted incoming communication 20' is decrypted by the security module 13 to decrypted incoming communication 20 (same as in FIG. 3A) and provided to the at least one original module 12. In this way, encrypted communication is enabled without requiring any modification to the at least one original module 12.

Figure 4A:
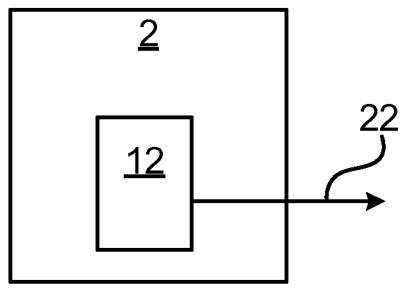
FIGS. 4A-B are schematic drawings illustrating the use of a security module for outgoing communication in a software container of FIG. 2 according to one embodiment.
Figure 4B:
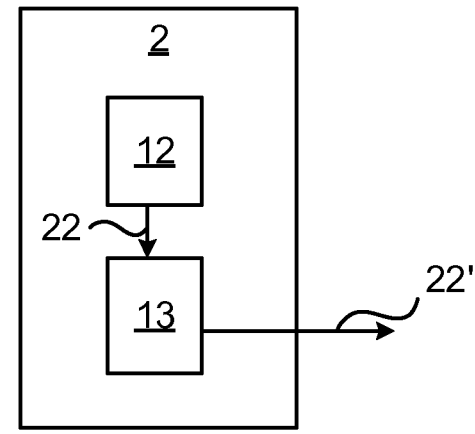

FIGS. 4A-B are schematic drawings illustrating the use of a security module for outgoing communication in a software container of FIG. 2 according to one embodiment. FIG. 4A illustrates outgoing communication according to the prior art. The at least one original module 12 of the software container sends outgoing communication 22, e.g. to a remote software container.

Looking now to FIG. 4B, the security module 13 first receives the outgoing communication 22. The outgoing communication 22 (same as in FIG. 3A) is encrypted by the security module 13 to encrypted outgoing communication 22' and is sent to the receiver. In this way, encrypted communication is enabled without requiring any modification to the at least one original module 12.

The communication shown in FIGS. 3B and 4B are combined to provide transparent secure communication for the software container 2. In this way, secure communication can be provided for all communication to and from the software container 2, which can be usable in what is called zero trust. In zero trust, no communication network is assumed to be safe, whereby all communication is encrypted. Using the embodiments presented herein, this is achieved without placing a burden on the application developer, since the encryption and decryption is achieved transparently using the security module.

Figure 5A:
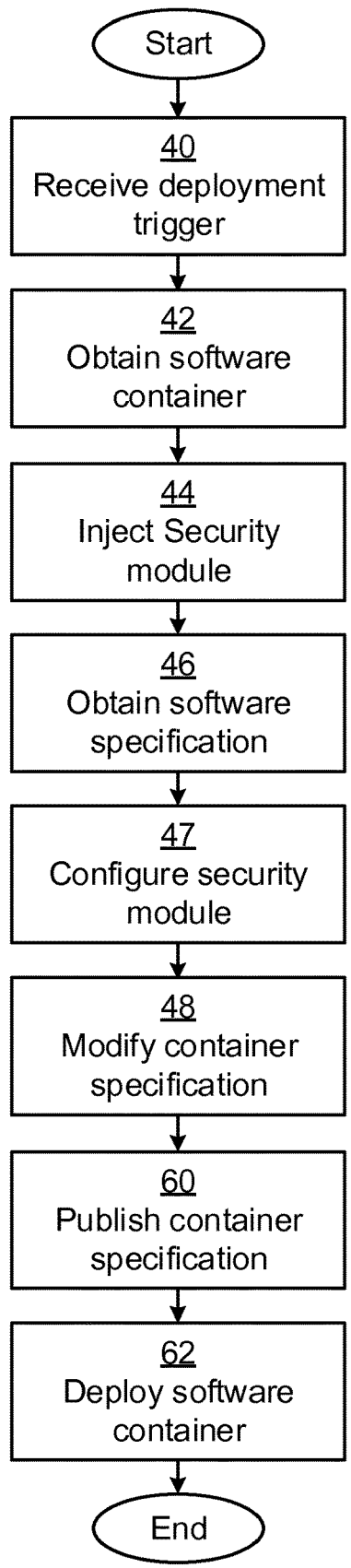
FIGS. 5A-B are flow charts illustrating embodiments of methods performed in the deployment server of FIG. 1.
Figure 5B:
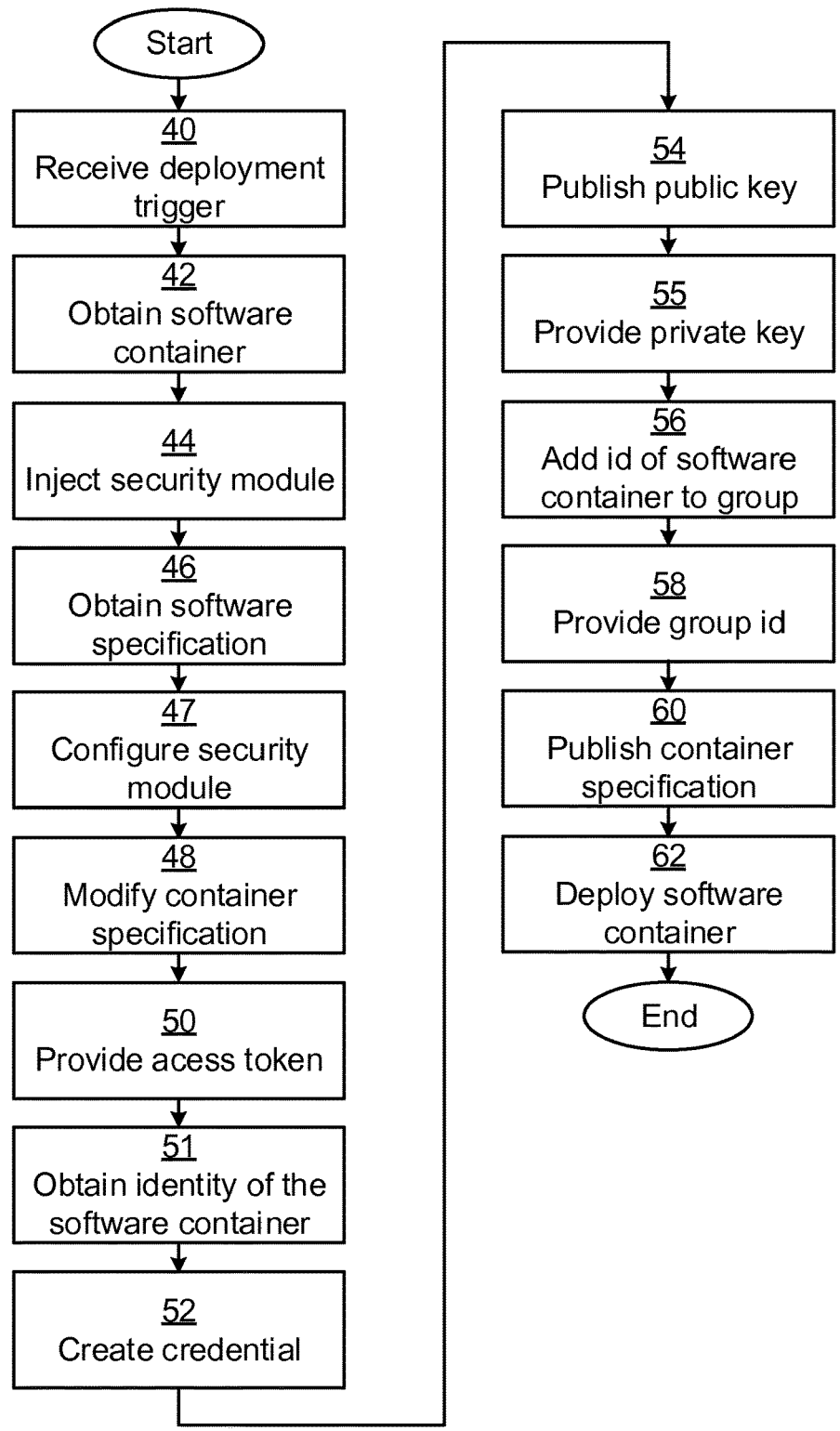

FIGS. 5A-B are flow charts illustrating embodiments of methods performed in the deployment server of FIG. 1. As explained above, the deployment server is configured to deploy a software container.

In a receive deployment trigger step 40, a trigger to deploy a software container is received. This can be a deployment message commanding a particular software container is to be deployed using the one or more execution servers.

In an obtain software container step 42, an image intended for the software container is obtained. The image is a file system which comprises a set of at least one module.

In an inject security module step 44, a security module in the image is injected, e.g. illustrated by the security module 13 forming part of the software container 2 of FIG. 2.

In an obtain software specification step 46, a container specification of the image is obtained. The container specification can e.g. be obtained from the distributed security repository (11 of FIG. 2). The container specification comprises information of at least one service exposed by the set of at least one module. The container specification describes the services that the software container offers and the remote services which are intended to be consumed. Moreover, the container specification can include a remote network address intended to be used to contact each such remote service. The remote network address can be a virtual address, i.e. a placeholder address which is replaced by a proper address at a later stage.

In a configure security module step 47, the security module is configured to forward incoming communication to the set of at least one module in accordance with the obtained container specification. Moreover, the security module can be configured in accordance with expected outgoing communication of the set of at least one module.

In a modify container specification step 48, the container specification is modified such that the at least one service is accessed externally only via the security module and that all outgoing communication, from the set of at least one module, is directed via the security module.

In a publish container specification step 60, the modified container specification is published in a service discovery repository. As explained above, the service discovery repository can be a distributed peer-to-peer service discovery repository.

In a deploy software container step 62, the software container is deployed on at least one execution server.

Looking now to FIG. 5B, only new or modified steps compared to the methods illustrated by FIG. 5A will be described.

In an optional provide access token step 50, an access token is provided to the security module for enabling access to the distributed security repository. As explained above, the distributed security repository may be a blockchain database.

In an optional obtain identity of the software container step 51, an identifier of the image is obtained. This identity can be generated, obtained from the image or it can be retrieved from a local or remote storage.

In an optional create credential step 52, a credential for the image is created. The credential comprises a public key and a private key. When the provide access token step 50 is performed, the create credential step 52 is performed in the security module.

In an optional publish public key step 54, the public key is published in a distributed security repository, in association with the identity of the software container to allow the public key to be found.

In an optional provide private key step 55, the private key is provided to the security module. The private key can later be used for decrypting communication encrypted using the public key.

In an optional add id (identifier) of software container to group step 56, the identifier of the image is added to a container group of the distributed security repository.

In an optional provide group id step 58, an identifier of the container group is provided to the security module.

Figure 6:
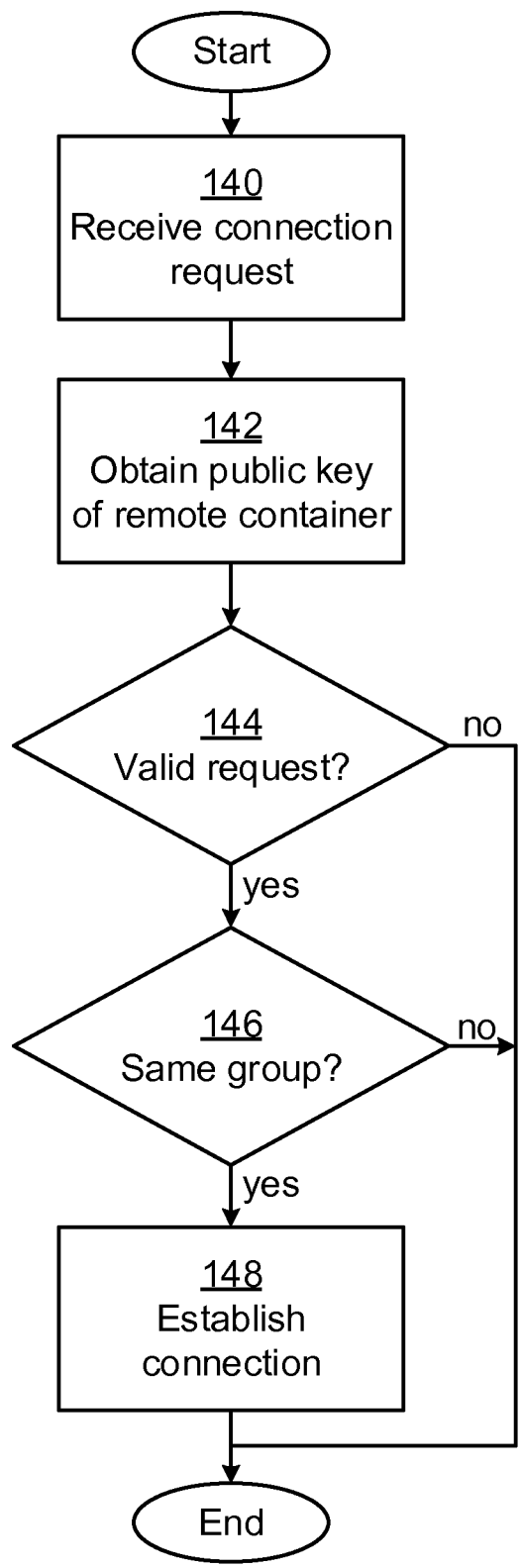
FIG. 6 is a flow chart illustrating embodiments of a method performed in the execution server of FIG. 2.

FIG. 6 is a flow chart illustrating embodiments of a method performed in the execution server of FIG. 2. The method is performed for establishing a connection of between a local software container of a local execution server and a remote software container of a remote execution server. The method is performed in the local software container of the local execution server. More specifically, the method can be performed in the security module which has been injected in the software container in accordance with the methods described above with reference to FIGS. 5A-B.

In a receive connection request step 140 a request is received from the remote software container to establish a connection between the remote software container and the local software container. The request comprises an identifier of the remote software container. Optionally, the request comprises an identifier of a container group to which the remote software container belongs.

In an obtain public key of remote container step 142, a public key of the remote software container is obtained from a distributed security repository using the identifier of the remote software container. As explained above, the distributed security repository can be a blockchain database. For instance, the distributed security repository can be based on Apache Hyperledger. Nevertheless, it is possible to implement the distributed security repository using other blockchain implementations and also conventional approaches with servers linked by a distributed consensus protocol. However, a blockchain-based approach has the added benefit of an immutable history of actions and transactions in the system and can thus be viewed as a tamper resistant database in which no party alone can manipulate data without consensus from other parties. The transaction history also creates traceability and transparency without exposing sensitive security information.

In a conditional valid request step 144, it is determined whether the request is valid using the public key of the remote software container. This determination is e.g. based on validating a signature of the request using a digital signature of the request. If the request is valid, the method proceeds to a conditional same group step 146. Otherwise, the method ends.

In the conditional same group step 146, container group data is obtained from the distributed security depository. It is then determined whether both the remote software container and the local software container belong to the same container group. If this is the case, the method proceeds to an establish connection step 148. Otherwise, the method ends.

In the establish connection step 148, a connection is established. The connection is a connection between the local software container of the local execution server and the remote software container of the remote software container.

Figure 7:
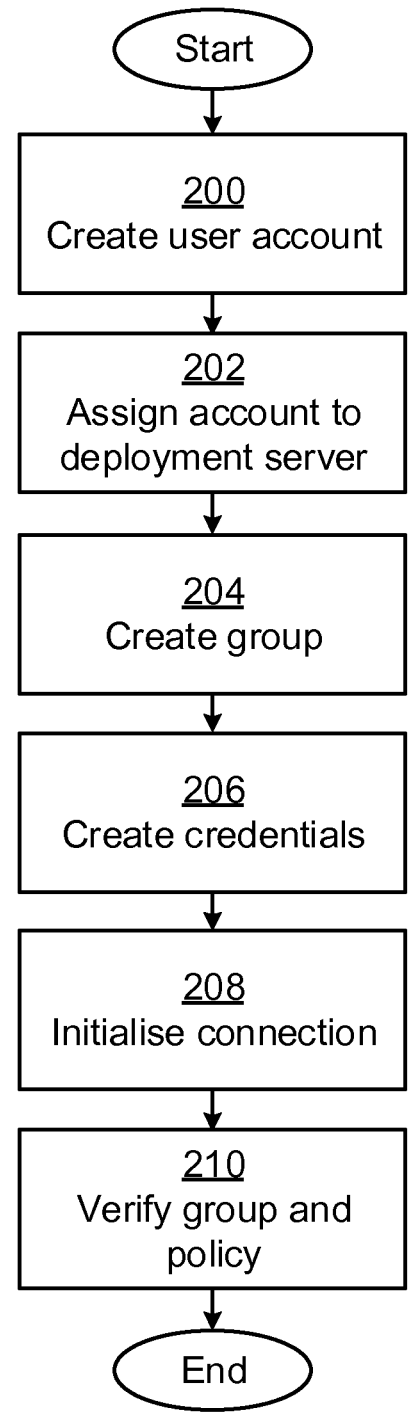
FIG. 7 is a flow chart illustrating embodiments of a method where a configuration for two communicating software containers is created.

FIG. 7 is a flow chart illustrating embodiments of a method where a configuration for two communicating software containers is created.

In a create user step 200, a user U account is created. This can only be done by the system owner, e.g. the owner of the distributed security depository. The public part (self-generated identifier+public key) of the credentials for user U is stored in the distributed security depository, while user U stores the private part of the key locally. The key generation is done by the client so the private key is never sent to the distributed security depository.

In an assign account to deployment server step 202, the deployment server, hereinafter denoted deployer, is assigned an account, i.e. a self-generated identifier and a public-private key pair. The identifier and the associated public key is published to the distributed security depository similar to the procedure described in the create user step 200.

In a create group step 204, user U employs his private credentials to create a group G, which a policy document stores in the distributed security depository. The policy document is also assigned a self-generated identifier. The group G also contains identifiers of all components that are allowed to communicate and optionally additional policies regulating the components behaviour within the group. User U also adds the deployer to group G (i.e. the identifier of the deployer is added to the policy document). User U then delegates group modification capabilities by adding a rule granting the deployer the rights to add new container identifiers to group G belonging to the same application. Finally, user U also adds a default rule stating how software containers are allowed to communicate, for example a policy stating that all software containers belonging to the same group is allowed to communicate with each other.

In a create credentials step 206, when a software container is deployed by the deployer, it first creates a credential for the security module of the software container. Similar to steps 200 and 202, the public part of the credential (self-generated identifier+public key) is published to the distributed security depository. The deployer also configures the security module of the software container to connect to the distributed security depository. Alternatively, the security module of the software container could create its own credential but in this case the deployer must pass a token to the security module allowing it to access the distributed security depository. The identifier of the spawned software container is passed back to the deployer, which then adds it to group G. The deployer also notifies the security module of the software container which group it belongs to.

Two software containers, C1 and C2 are spawned according to the procedure described for the create credentials step 206.

In an initialise connection step 208, when a connection is established from C1 to C2, the first part of the communication is an initialisation message sent by C1 to C2 that contains the identifier of C1 as well as the identifier of group G. The message is also signed with the private key of C1. When the message is received by software container C2, the identity of C1 is verified by getting the public key associated with C1 from the distributed security depository and then verifying the signature using the downloaded public key. If distributed security depository is implemented using blockchain technologies, nobody except C1 can modify the published public key once it has been stored in the distributed security depository.

In a verify group and policy step 210, the identity of C1 is now confirmed. Next, it is checked if C2 belongs to the same group as C1 and enforce defined policies. The security module running on C1 now downloads the policy document describing group G from the distributed security depository. Communication between C2 and C1 is only allowed if C2 can confirm the presence of both C1 and C2 in group G. Additionally, C2 enforces any additional policies stored in group G if such are present. Note that group G can only by manipulated by sending a message to the distributed security depository and signing the message with the private key of user U or an entity with delegated responsibility by user U. Note that C2 trusts C1 since C2 knows that only user U (or an entity with responsibility delegated by user U) can add C1 to group G, which C2 also belongs to.

Using the embodiments presented herein, secure communication between software containers is achieved without additional strain on the developer of the original modules to implement the security layer. Also, by providing the transparent security layer for all communication, software containers can run across several platforms at the same time, for exampling using containers on both Docker and Kubernetes hosts spread across different data centres, which makes it suitable for distributed cloud environments such as edge computing. The solution works with any kind of applications running inside the software container, regardless of programming language; without adaptation.

Figure 8:
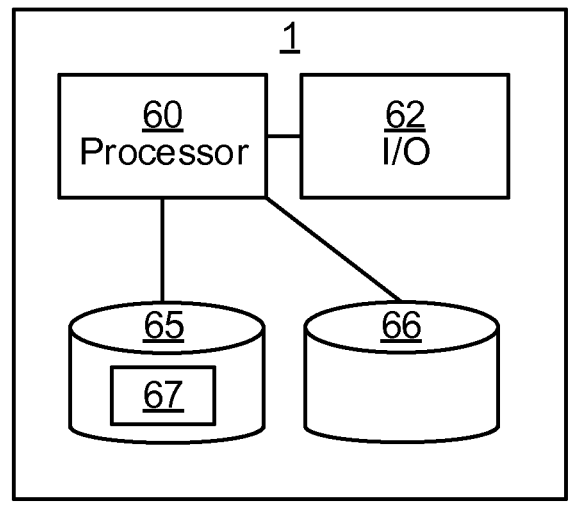
FIG. 8 is a schematic diagram illustrating components of the deployment server of FIG. 1.

FIG. 8 is a schematic diagram illustrating components of the deployment server 1 of FIG. 1. A processor 6o is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the methods described with reference to FIGS. 5A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during to execution of software instructions in the processor 60. The data memory 66 can be any combination of read and write memory (RAM) and read only memory (ROM).

The deployment server 1 further comprises an I/O interface 62 for communicating with other external entities, e.g. execution servers.

Other components of the deployment server 1 are omitted in order not to obscure the concepts presented herein.

Figure 9:
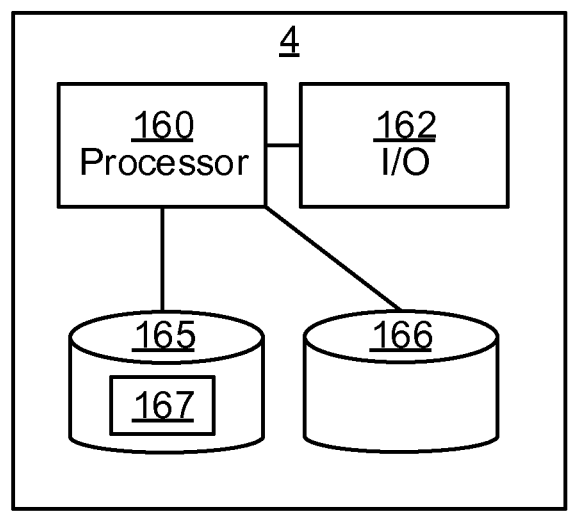
FIG. 9 is a schematic diagram illustrating components of the execution server of FIG. 2.

FIG. 9 is a schematic diagram illustrating components of the execution server 4 of FIG. 2. A processor 160 is provided using any combination of one or more of a suitable central processing unit (CPU), multiprocessor, microcontroller, digital signal processor (DSP), application specific integrated circuit etc., capable of executing software instructions 167 stored in a memory 165, which can thus be a computer program product. The processor 160 can be configured to execute the method described with reference to FIG. 6 above.

The memory 165 can be any combination of read and write memory (RAM) and read only memory (ROM). The memory 165 also comprises persistent storage, which, for example, can be any single one or combination of magnetic memory, optical memory, solid state memory or even remotely mounted memory.

A data memory 166 is also provided for reading and/or storing data during execution of software instructions in the processor 160. The data memory 166 can be any combination of read and write memory (RAM) and read only memory (ROM).

The execution server 4 further comprises an I/O interface 162 for communicating with other external entities, e.g. a deployment server.

Other components of the execution server 4 are omitted in order not to obscure the concepts presented herein.

Figure 10:
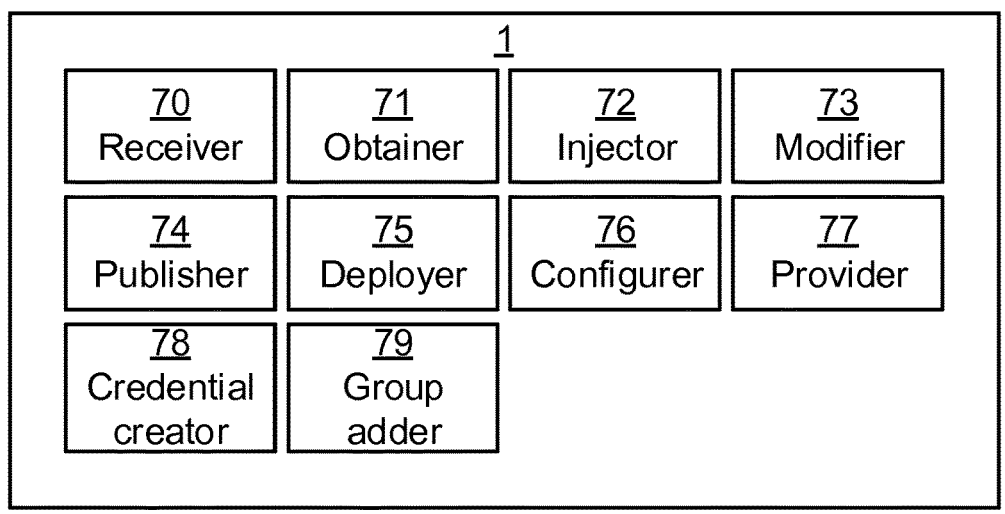
FIG. 10 is a schematic diagram showing functional modules of the deployment server of FIG. 1 according to one embodiment.

FIG. 10 is a schematic diagram showing functional modules of the deployment server 1 of FIG. 1 according to one embodiment. The modules are implemented using software instructions such as a computer program executing in the deployment server 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated by FIGS. 5A-5B.

A receiver 70 corresponds to step 40. An obtainer 71 corresponds to steps 42, 46 and 51. An injector 72 corresponds to step 44. A modifier 73 corresponds to step 48. A publisher 74 corresponds to steps 54 and 60. A deployer 75 corresponds to step 62. A configurer 76 corresponds to step 47. A provider 77 corresponds to steps 50, 55 and 58. A credential creator 78 corresponds to step 52. A group adder 79 corresponds to step 56.

Figure 11:
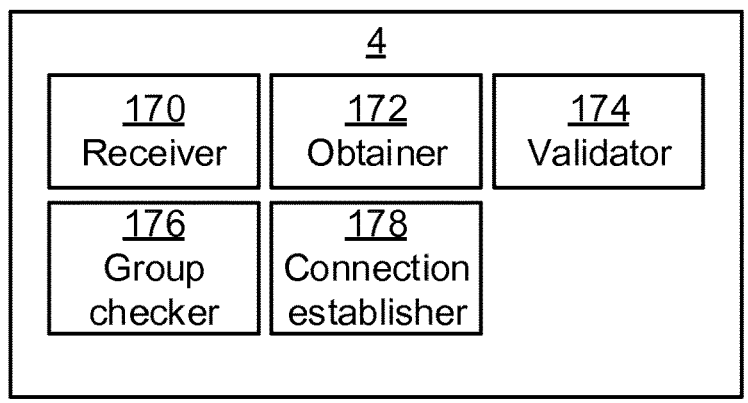
FIG. 11 is a schematic diagram showing functional modules of the execution server of FIG. 2 according to one embodiment.

FIG. 11 is a schematic diagram showing functional modules of the execution server 4 of FIG. 2 according to one embodiment. The modules are implemented using software instructions such as a computer program executing in the execution server 4. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated by FIG. 6.

A receiver 170 corresponds to step 140*o*. An obtainer 172 corresponds to step 142. A validator 174 corresponds to step 144. A group checker 176 corresponds to step 146. A connection establisher 178 corresponds to step 148.

Figure 12:
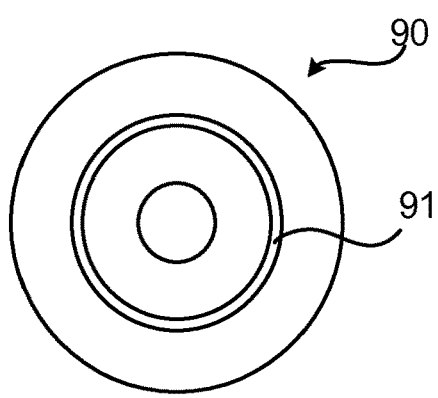
FIG. 12 shows one example of a computer program product comprising to computer readable means.

FIG. 12 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 8 or the computer program product 165 of FIG. 9. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed in a deployment server, the deployment server being configured to deploy a software container, the method comprising the steps of:
receiving a trigger to deploy a software container;
obtaining an image intended for the software container, the image comprising a set of at least one module;
injecting a security module in the image;
obtaining a container specification of the image, the container specification comprising information of at least one service exposed by the set of at least one module;
configuring the security module to forward incoming communication to the set of at least one module in accordance with the obtained container specification;
modifying the container specification such that the at least one service is accessed externally only via the security module and that all outgoing communication, from the set of at least one module, is directed via the security module;
publishing the modified container specification in a service discovery repository; and
deploying the software container on at least one execution server.

2. The method of claim 1, further comprising the steps of:
obtaining an identifier of the image;
creating a credential for the image, the credential comprising a public key and a private key;
publishing the public key in a distributed security repository; and
providing the private key to the security module.

3. The method of claim 2, wherein the step of creating a credential is performed in the security module and wherein the method further comprises the steps of:
providing an access token to the security module for enabling access to the distributed security repository.

4. The method of claim 2, further comprising the steps of:
adding the identifier of the image to a container group of the distributed security repository; and
providing an identifier of the container group to the security module.

5. The method of claim 2, wherein the distributed security repository is a blockchain database.

6. The method of claim 1, wherein the service discovery repository is a distributed peer-to-peer service discovery repository.

7. A deployment server being configured to deploy a software container, the deployment server comprising:
a processor; and
a memory storing instructions that, when executed by the processor, cause the deployment server to:
receive a trigger to deploy a software container;
obtain an image intended for the software container comprising a set of at least one module;
inject a security module in the image;
obtain a container specification of the image, the container specification comprising information of at least one service exposed by the set of at least one module;
configure the security module to forward incoming communication to the set of at least one module in accordance with the obtained container specification;
modify the container specification such that the at least one service is accessed externally only via the security module and that all outgoing communication, from the set of at least one module, is directed via the security module;
publish the modified container specification in a service discovery repository; and
deploy the software container on at least one execution server.

8. The deployment server of claim 7, further comprising instructions that, when executed by the processor, cause the deployment server to:
obtain an identifier of the image;
create a credential for the image, the credential comprising a public key and a private key;
publish the public key in a distributed security repository; and
provide the private key to the security module.

9. The deployment server of claim 8, wherein the instructions to create a credential are performed in the security module and wherein the deployment server further comprise instructions that, when executed by the processor, cause the deployment server to:
provide an access token to the security module for enabling access to the distributed security repository.

10. The deployment server of claim 8, further comprising instructions that, when executed by the processor, cause the deployment server to:
- add the identifier of the image to a container group of the distributed security repository; and
- provide an identifier of the container group to the security module.

11. The deployment server of claim 8, wherein the distributed security repository is a blockchain database.

12. The deployment server of claim 7, wherein the service discovery repository is a distributed peer-to-peer service discovery repository.

13. A method for establishing a connection between a local software container of a local execution server and a remote software container of a remote execution server, the method being performed in the local software container of the local execution server and comprising the steps of:
- receiving a request from the remote software container to establish a connection between the remote software container and the local software container, the request comprising an identifier of the remote software container;
- obtaining a public key of the remote software container from a distributed security repository using the identifier of the remote software container;
- validating the request using the public key of the remote software container;
- when the request is found to be valid, obtaining container group data from the distributed security repository, and
- proceeding with connection establishment when both the remote software container and the local software container belong to the same container group.

14. The method of claim 13, wherein the request comprises an identifier of a container group to which the remote software container belongs.

15. The method of claim 13, wherein the step of validating comprises validating the request by validating a signature of the request using a digital signature of the request.

16. The method of claim 13, wherein the distributed security repository is a blockchain database.

17. An execution server for establishing a connection between a local software container of the execution server, being a local execution server, and a remote software container of a remote execution server, the local execution server comprising:
- a processor; and
- a memory storing instructions that, when executed by the processor, cause the local execution server to:
- receive a request from the remote software container to establish a connection between the remote software container and the local software container, the request comprising an identifier of the remote software container;
- obtain a public key of the remote software container from a distributed security repository using the identifier of the remote software container;
- validate the request using the public key of the remote software container; and
- when the request is found to be valid, obtain container group data from the distributed security repository, and
- proceeding with connection establishment when both the remote software container and the local software container belong to the same container group.

18. The execution server of claim 17, wherein the request comprises an identifier of a container group to which the remote software container belongs.

19. The execution server of claim 17, wherein the step of validating comprises validating the request by validating a signature of the request using a digital signature of the request.

20. The execution server of claim 17, wherein the distributed security repository is a blockchain database.

* * * * *